United States Patent
Maumus et al.

[11] Patent Number: 5,980,669
[45] Date of Patent: Nov. 9, 1999

[54] METHOD OF MANUFACTURING COMPLEX ONE-PIECE STRUCTURAL PARTS OF COMPOSITE MATERIAL

[75] Inventors: Jean-Pierre Maumus, Cenon; Guy Martin, St. Aubin Du Medoc, both of France

[73] Assignee: Societe Nationale D'Etude et de Construction de Moteurs D'Aviation, Paris, France

[21] Appl. No.: 08/750,295

[22] PCT Filed: Apr. 2, 1996

[86] PCT No.: PCT/FR96/00492

§ 371 Date: Dec. 5, 1996

§ 102(e) Date: Dec. 5, 1996

[87] PCT Pub. No.: WO96/32527

PCT Pub. Date: Oct. 17, 1996

[30] Foreign Application Priority Data

Apr. 13, 1995 [FR] France .................................. 95 04449

[51] Int. Cl.⁶ ............................. B29B 11/16; D04H 18/00
[52] U.S. Cl. ............................. 156/148; 156/91; 156/250; 156/264
[58] Field of Search ................................ 156/92, 93, 166, 156/267, 250, 264, 148, 91; 428/140, 139, 138; 403/267, 410; 423/447.1, 447.2; 264/29.1

[56] References Cited

U.S. PATENT DOCUMENTS 4,966,802  10/1990  Hertzberg .................................. 156/93
5,112,422   5/1992  Takahashi ................................ 156/175
5,114,762   5/1992  Bontems et al. ..................... 156/174 X
5,310,434   5/1994  Vives et al. .............................. 156/92

FOREIGN PATENT DOCUMENTS

0424988   5/1991   European Pat. Off. .
2177345   1/1987   United Kingdom .
2251001   6/1992   United Kingdom .
WO9204492 3/1992   WIPO .

*Primary Examiner*—Jeff H. Aftergut
*Attorney, Agent, or Firm*—Weingarten, Schurgin, Gagnebin & Hayes LLP

[57] ABSTRACT

A fiber preform is made solely from a deformable base fiber structure that is initially in the form of a plane plate constituted by superposed two-dimensional fiber plies bonded together by needling. Cuts and/or splits are formed in the base fiber structure, and the preform is made from the cut and/or split base fiber structure by making use of its ability to be deformed. The structural part is obtained by densifying the preform using a material that constitutes a composite material matrix. It is possible to use a single fiber structure plate which is deformed with the help of splits or cuts so as to obtain the desired preform and in which continuity of the base fiber structure is preserved, or else a plurality of base fiber structure plates can be used which are assembled together by mutual interfitting via the splits or cuts, by deforming at least one of the plates.

3 Claims, 8 Drawing Sheets

METHOD OF MANUFACTURING COMPLEX ONE-PIECE STRUCTURAL PARTS OF COMPOSITE MATERIAL

The present invention relates to manufacturing structural parts of complex shape out of composite material.

In well known manner, a method of manufacturing a part out of composite material comprises making a fiber reinforcement structure or "preform", and then densifying the preform with a matrix that fills the accessible pores of the preform, at least in part.

For example, the fiber preform is made from fibers that are in the form of felts, mats, threads, cables, twisted strands, yarns, . . . Threads or cables may be wound on reels, or disposed in unidirectional sheets, or woven to form sheets of woven cloth, braids, or three-dimensional woven structures. The preform is given a shape that corresponds to that of the composite material part that is to be made. This can be done by winding filaments, from unidirectional elements, or by superposing plies that are stacked flat or wound or draped over a former. In which case, the superposed plies can be bonded together by implanting threads or by needling.

The preform can be densified using a liquid method or by chemical vapor infiltration.

The liquid method consists in impregnating the preform or in making it from pre-impregnated threads or plies, with the composition of the impregnation constituting a precursor of the matrix. The precursor, e.g. a resin, is generally transformed by heat treatment.

Chemical vapor infiltration is performed by placing the preform in an enclosure into which a gas is admitted containing at least one precursor of the matrix. Under the conditions, in particular of temperature and pressure, that are established within the enclosure, the gas diffuses into the preform within which a matrix-forming deposit is formed by decomposition of a gaseous precursor, or by a reaction between gaseous precursors, on coming into contact with the fibers of the preform.

The materials constituting the preform and the matrix are selected as a function of the application envisaged for the composite material part. For structural parts that are subjected in operation to high temperatures, it is advantageous to make use of thermostructural composite materials. Such materials are characterized by mechanical properties that make them suitable for constituting structural elements, and also by their ability to conserve such mechanical properties at high temperatures. By way of example, such materials comprise carbon—carbon or C—C composite materials (a carbon fiber preform densified by a carbon matrix), or ceramic matrix composite materials or CMCs (carbon or ceramic fiber preform densified with a ceramic matrix).

Making composite material structural parts of complex shape poses special problems. The term "complex shape" is used herein to designate a shape that it is difficult or impossible to obtain by simple operations of winding or of draping or stacking plies, i.e. shapes other than plane, parallelepipedal, cylindrical, or bodies of revolution.

One known technique for making composite material parts of complex shape consists in making components therefor which are simple in shape, and then in assembling the components together. However, that inevitably gives rise to discontinuities in the assembled parts, which can affect their mechanical properties. In addition, it is necessary to make use of assembly elements that are themselves made of composite material, in particular screw fasteners, and these are expensive to make.

To avoid the above drawbacks, at least in part, proposals have been made to assemble together a plurality of parts that are simple in shape while they are still in the form of preforms, prior to being densified. Assembly can be performed by juxtaposing preform portions and by holding them in place by means of tooling for densification purposes. The tooling can be removed after a consolidation stage, i.e. after an initial densification stage that is sufficient to bond the preform portions together so that the preform can be handled while still retaining its shape. The use of tooling gives rise to significant drawbacks. When densification is performed by chemical vapor infiltration, the tooling is generally made of graphite and is expensive and fragile. In addition, prior to being reused, it must be re-machined in order to eliminate the deposits that form thereon. Also, whatever method of densification is used, the more complex the shape of the part to be made, the more complicated it is to make the tooling, and the bulkier the result.

Proposals have also been made in document EP-A-0 390 685 to assemble preform portions together by means of pegs made of fiber fabric. The assembled-together preform portions are co-densified. Any risk of the parts lacking cohesion is reduced by the way in which the preform portions are assembled together combined with the bonding provided by the continuity of matrix material at their interfaces. When preform portions are assembled together by means of pegs, it is also possible to avoid using full tooling for holding the preform together until it has consolidated. Nevertheless, that technique requires the use of bonding elements such as pegs which need to be manufactured separately or which need to be formed on one of the preform portions. It is also necessary to provide housings for the assembly pegs. In addition, discontinuities remain between the preform portions.

An object of the present invention is to provide a method enabling composite structural parts to be made that are complex in shape, that are of the nature of one-piece parts, and that do not require separate assembly elements to be used, thus enabling them to be made in a manner that is simple and cheap.

According to the invention, this object is achieved by the fact that the preform is made solely from a base fiber structure that is deformable and in the form of a plane plate built up from superposed two-dimensional fiber plies that are bonded together by needling. Cuts and/or splits are formed in the base fiber structure, and the preform is built from the base fiber structure by taking advantage of its deformability.

According to one of its aspects, the method of the invention is characterized by the fact that the preform is made from a single plate of base fiber structure in which cuts and/or splits are formed and which is deformed to obtain the desired preform in which continuity of the base fiber structure is preserved.

This avoids drawbacks that could result from discontinuity in the fiber reinforcement in a composite part whose preform is built up from a plurality of distinct portions.

The preform may be made by folding the single plate of base fiber structure. The bonding portions may be cut out from the plate of fiber structure so as to be capable of being mutually engaged after deformation of the plate and so as to be capable of holding the plate at least in part in the deformed state.

According to another of its aspects, the preform is built up from a plurality of base fiber structure plates in which cuts and/or splits are formed, and the fiber structure plates are assembled together by being mutually interfitted by deforming at least one of them.

The preform made in this way by mutually inter-fitting base fiber structure plates can keep its shape without help from holding means. It is therefore no longer necessary to make use of tooling or resin impregnation to hold it together during densification, at least until consolidation has been achieved, and that constitutes an appreciable advantage.

According to yet another of its aspects, at least one split is formed in a fiber structure plate parallel to the faces thereof, and preform manufacture includes a step of deforming at least one of the two portions of the plate bordering the split.

Various desired shapes can thus be obtained by selecting the location and the depth of the split(s). The preform can thus be put into shape by deforming at least one of the two portions of the fiber structure plate bordering a split. One and/or the other of said two portions can be deformed even to the extent of forming a loop.

The above technique thus makes it easy to make complex shapes from a single plate of fiber structure or from a plurality of plates.

A plate portion initially bordering a split can be held in its deformed portion by means of local tooling, or by impregnating the fiber structure with a resin, advantageously a resin that is a precursor for the matrix material.

Implementations of methods of the invention are described below by way of non-limiting indication.

Reference is made to the accompanying drawings, in which.

When implementing methods of the invention, a preform for a composite material part is made from a base fiber structure in the form of a plate that is preferably plane. The plate is built up of superposed two-dimensional plies that are bonded together by needling. By way of example, the two-dimensional plies may themselves be constituted by layers of woven cloth or by unidirectional sheets of threads or cables. When using unidirectional sheets, the directions of two superposed sheets are preferably different.

The methods of the invention use the ability of the base fiber structure to deform and to be compressed. They also make use of the properties of the structure, when deformed, for resisting delamination, i.e. separation between plies, and for resisting tear at the bottoms of the splits or cuts formed in the fiber structure due to the bonding provided by needling.

The making of fiber structures by superposing and needling two-dimensional plies is well known in the state of the art. In particular, reference may be made to document U.S. Pat. No. 4,790,052.

The material constituting the fibers of the base fiber structure is the material desired for the fibers of the preform within the composite part, or it is a precursor of said material.

When the reinforcing fiber material in the composite part is difficult to needle without being damaged, as is the case for carbon and ceramics, it is preferable to perform needling on fibers in the precursor state. Thus, for example, when the reinforcement of the composite part is made of carbon fibers, then the base fiber structure is made of preoxidized polyacrylonitrile (PAN) fibers. Preoxidized PAN is transformed into carbon by heat treatment, preferably after the preform has been made, with carbonization providing a degree of stiffness that restricts the deformation capacity of the fiber structure. The same applies to other precursors, whether they are precursors for carbon or for ceramic.

In the examples below, the parts made are parts of thermostructural composite material reinforced with carbon fibers and intended for use under quite severe thermomechanical conditions. These various parts are made of preforms themselves built up from base structures of preoxidized PAN fibers, it being understood that other carbon precursors could also be used.

Various means can be used to form the splits or cuts in the base fiber structure, for example it may be cut by a vibrating blade or by a jet of water under pressure. A method of cutting out a fiber structure by means of a jet of water is described in document U.S. Pat. No 5,097,731.

Figures 1A, 1B:
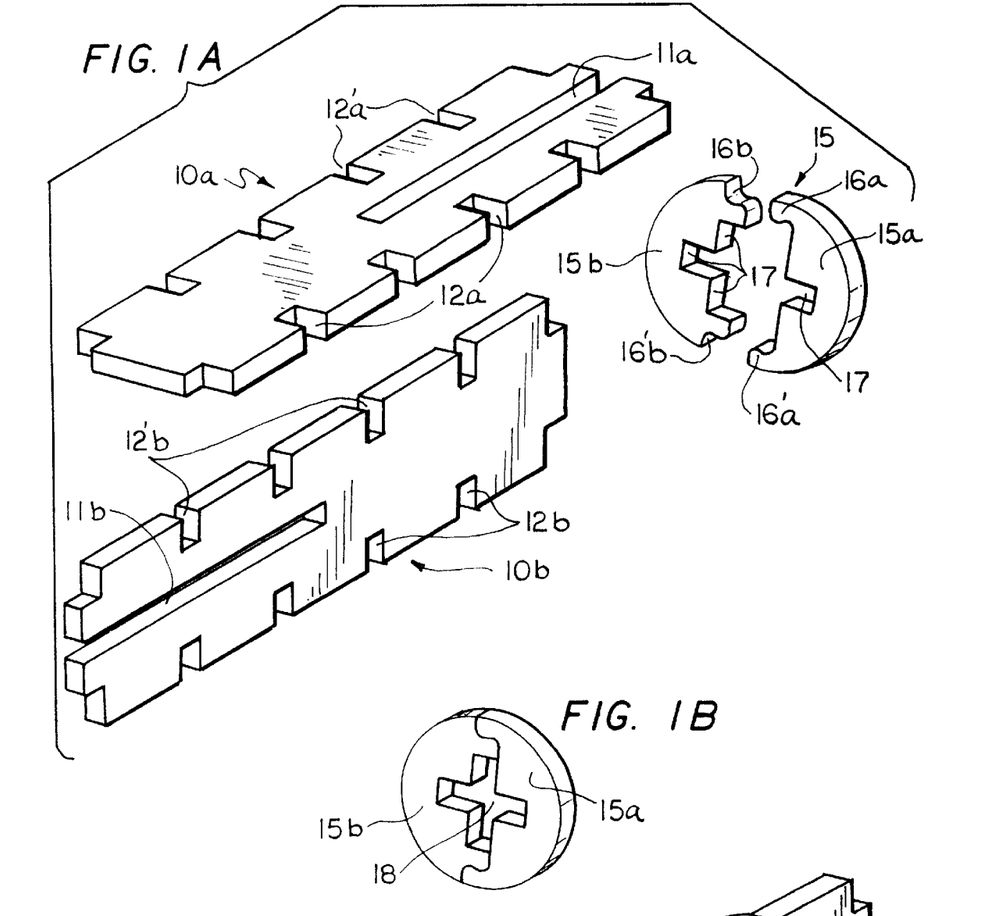
FIG. 1A is an exploded perspective view of components for a preform of a roller hub.
FIG. 1B shows how two components in the form of half-disks in FIG. 1A can be assembled together.
Figure 1C:
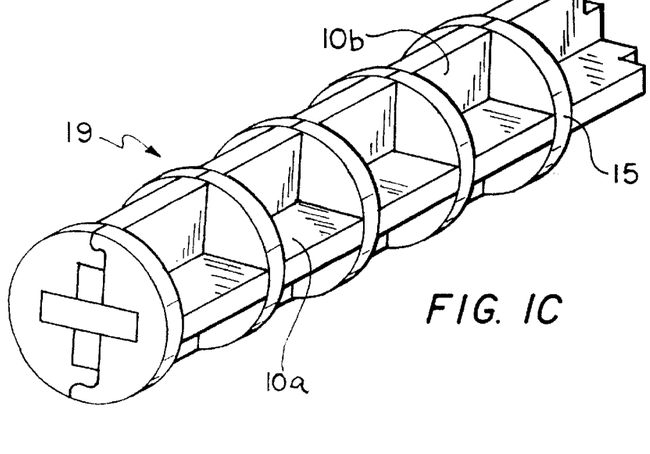
FIG. 1C shows the roller hub preform obtained after assembly has begun, with the components of FIG. 1A being mutually interfitted.

EXAMPLE 1 (FIGS. 1A, 1B, AND 1C)

Various components of a roller hub preform are shown in FIG. 1A. The components are cut out from a single plate or from a plurality of similar plates of base fiber structure.

The axis is defined by two rectangular bars 10a and 10b having the same dimensions. Each bar has a middle longitudinal notch 11a, 11b extending along half of the length of the bar, and of width very slightly less than the thickness of the bar. The notches 11a and 11b enable the bars 10a and 10b to be assembled together longitudinally so that they extend perpendicularly to each other.

The assembly also has disks 15 of diameter equal to the width of the bars 10a, 10b, and each of them is made up of two half-disks 15a and 15b. One of the half-disks, 15a, is terminated by lips 16a and 16'a that are swollen at their ends and that are designed to engage in corresponding recesses 16b and 16'b formed in the other half-disk 15b. Two half-disks are assembled together by moving them towards each other parallel to their faces, the lips 16a and 16'a engaging in the recesses 16b and 16'b by deforming, thereby locking together the two half-disks 15a and 15b. FIG. 1B shows two half-disks assembled together.

Transverse notches 12a, 12'a, 12b, and 12'b are formed at regular intervals along the two longitudinal edges of the bars 10a and 10b and they extend perpendicularly to said edges. The locations of the notches are identical on both longitudinal edges of the bars 10a and 10b such that after the bars have been assembled together, these notches lie in sets of four in common transverse planes.

Notches 17 are also formed in the half-disks so that once they have been assembled together they form a disk that is provided in its center with a cross-shaped recess 18 (FIG. 1B). The size of this recess between the bottoms of the notches 17 that are in alignment is equal to the distance between the bottoms of the notches 12a, 12'a in the bar 10a, and to the distance between the bottoms of the notches 12b, 12'b in the bar 10b.

The preform 19 is made, starting by assembling the two bars 10a and 10b together longitudinally. The compressibility of the fiber structure makes it possible to give the two notches 11a and 11b a width that is slightly less than the thickness of the bars. The bars assembled together in this way in mutual interfitting manner form a part of cross-section that holds its shape on its own. It is stiffened by inserting half-disks 15a and 15b transversely in the locations of the notches 12a, 12'a, 12b, 12'b and by the half-disks locking together in pairs (FIG. 1B shows the shape taken up by two assembled-together half-disks, it being understood that they are normally assembled together from opposite sides of the assembled-together bars 10a and 10b).

The preform 19 may optionally also include endpieces, and it is then densified, e.g. by chemical vapor infiltration. In spite of its complex shape, the preform 19 does not require any tooling to hold it together, even during a consolidation stage.

The roller hub obtained after densification, e.g. with a carbon matrix, can be used in applications where it is exposed to severe thermomechanical stresses, in particular in steel making installations.

Figure 2A:
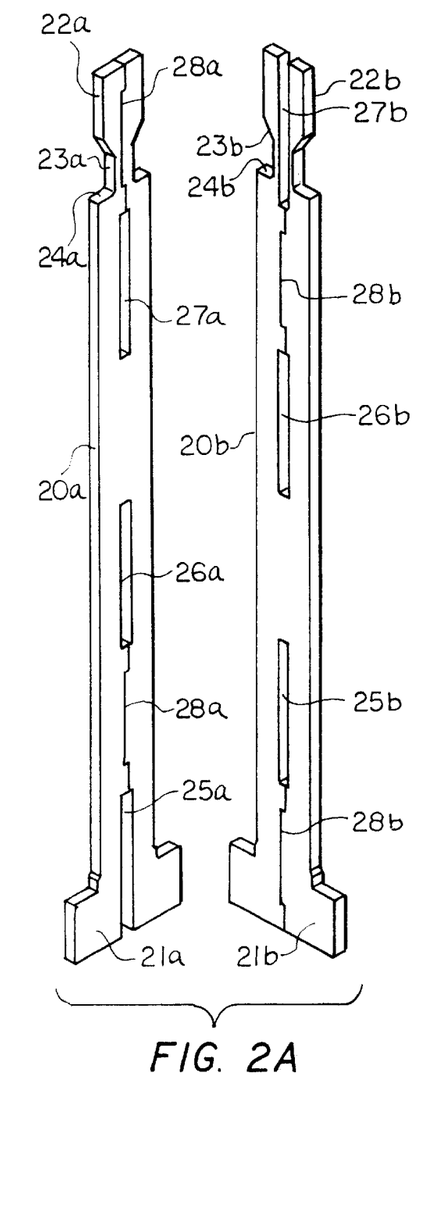
FIG. 2A is a perspective view of two components of a preform for a loading post constituting loading tooling of an oven.
Figure 2B:
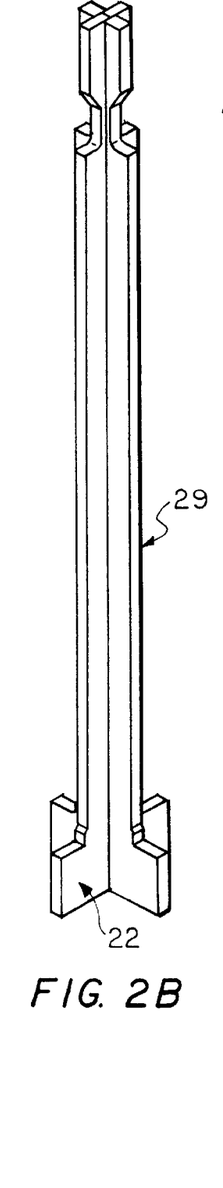
FIG. 2B shows the loading post preform obtained after assembling together the components of FIG. 2A by mutual interfitting.
Figure 2C:
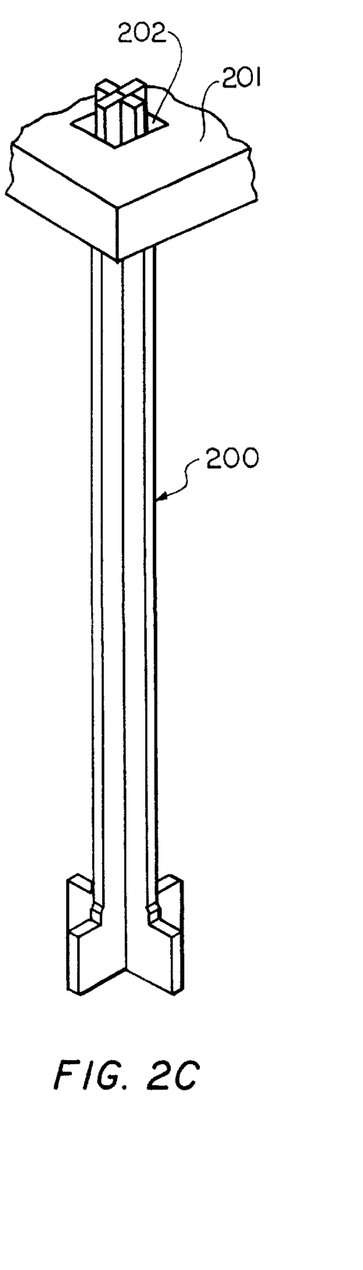
FIG. 2C shows the loading post obtained after the FIG. 2B preform has been densified.

EXAMPLE 2 (FIGS. 2A, 2B, AND 2C)

Two components for a loading post preform are shown in FIG. 2A. They are cut out from a single plate of fiber structure or from two similar plates.

These two components are in the form of two bars 20a and 20b of equal length. At one end 21a, 21b the bars 20a and 20b are of increased width. At their opposite ends, they have a portion of reduced width 22a, 22b which connects to the remainder of the bar via an even narrower portion 23a, 23b, forming a shoulder 24a, 24b.

In the middle portion of the bar 20a there are formed longitudinal notches or slots 25a, 26a, 27a, while in the middle portion of the bar 20b there are formed longitudinal notches or slots 25b, 26b, 27b. The width of the various notches or slots is substantially equal to the thickness of the bars. The slots or notches 25a, 26a, 27a extend in all over substantially half the length of the bar, as do the slots or notches 25b, 26b, 27b, but the location of a slot or notch in the bar 20a corresponds to a solid portion of the bar 20b, and vice versa. Longitudinal middle splits 28a are formed between the notch 25a which opens to the end 21a of the bar 20a and the slot 26a, and also between the slot 27a and the end 22a. In complementary manner, longitudinal mid-splits 28b are formed in the bar 20b between the end 21b and the slot 25b, and between the slot 26b and the notch 27b that opens out to the end 22b.

The preform 29 (FIG. 2C) is made by mutually interfitting the bars 20a and 20b perpendicularly to each other by means of the slots or notches and of the splits 28a, 28b which enable the fiber structure portions bordering the splits to cause the bars 20a and 20b to interfit one in the other. The fiber structure portions deformed in this way subsequently return to their initial shape and a loading post preform 29 is obtained having a cross-shaped section and with a stand 22 formed by the ends 22a and 22b.

The preform 29 is densified, e.g. with a carbon matrix obtained by chemical vapor infiltration, without requiring any supporting tooling. The C—C composite loading post 200 thus obtained can be used as a loading element in a heat treatment oven. As shown in FIG. 2C, a tray 201 can be engaged on the top of the post 200 via an orifice 202 and resting on abutments corresponding to the shoulders 24a, 24b.

Figure 3A:
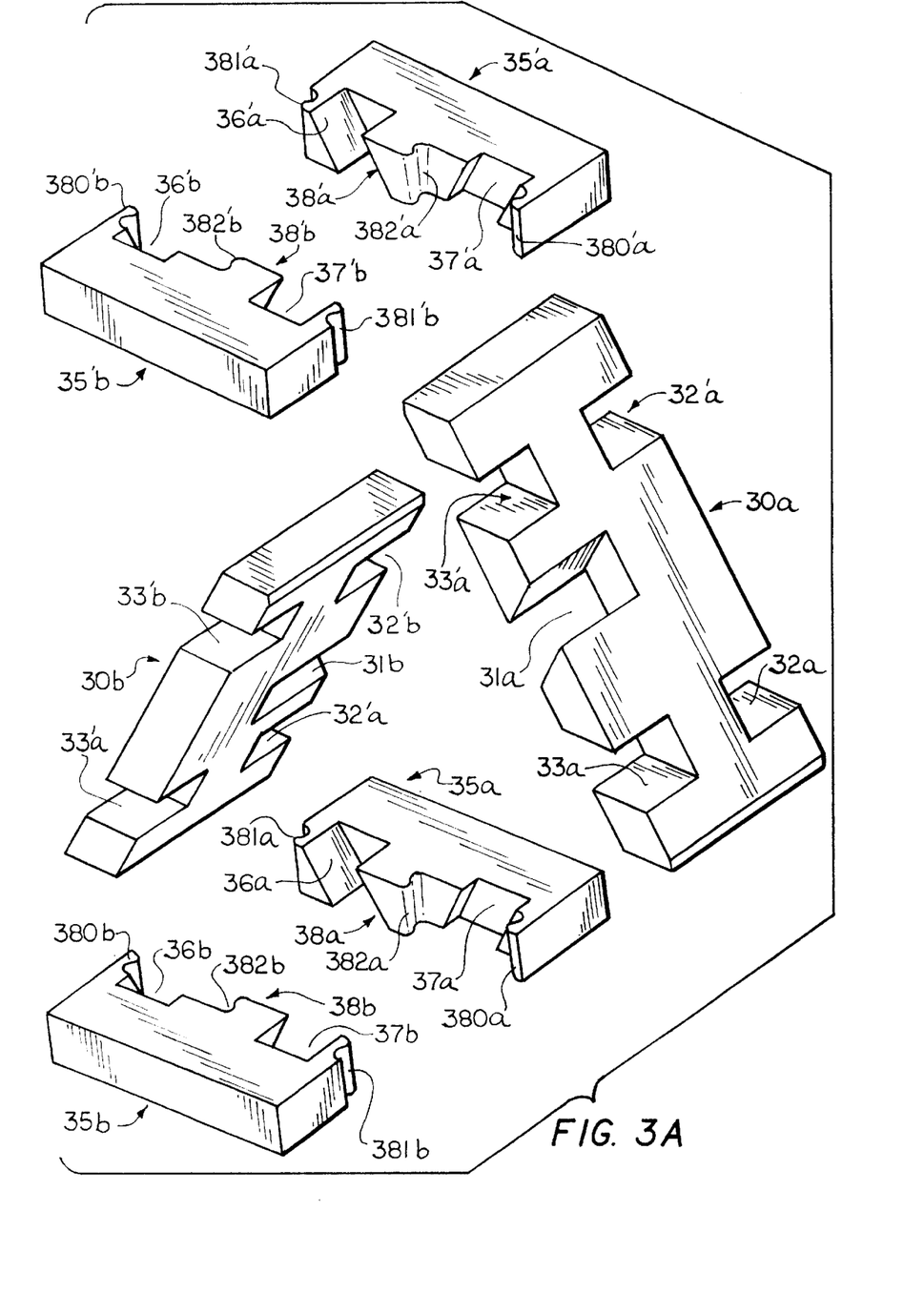
FIG. 3A is an exploded view of six components of a preform for a first form of spacer for oven loading tooling.
Figure 3B:
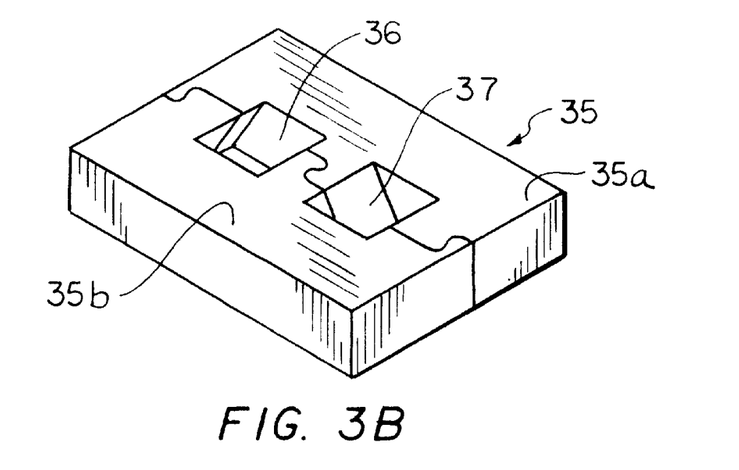
FIG. 3B shows how two complementary components of FIG. 3A can be assembled together.
Figure 3C:
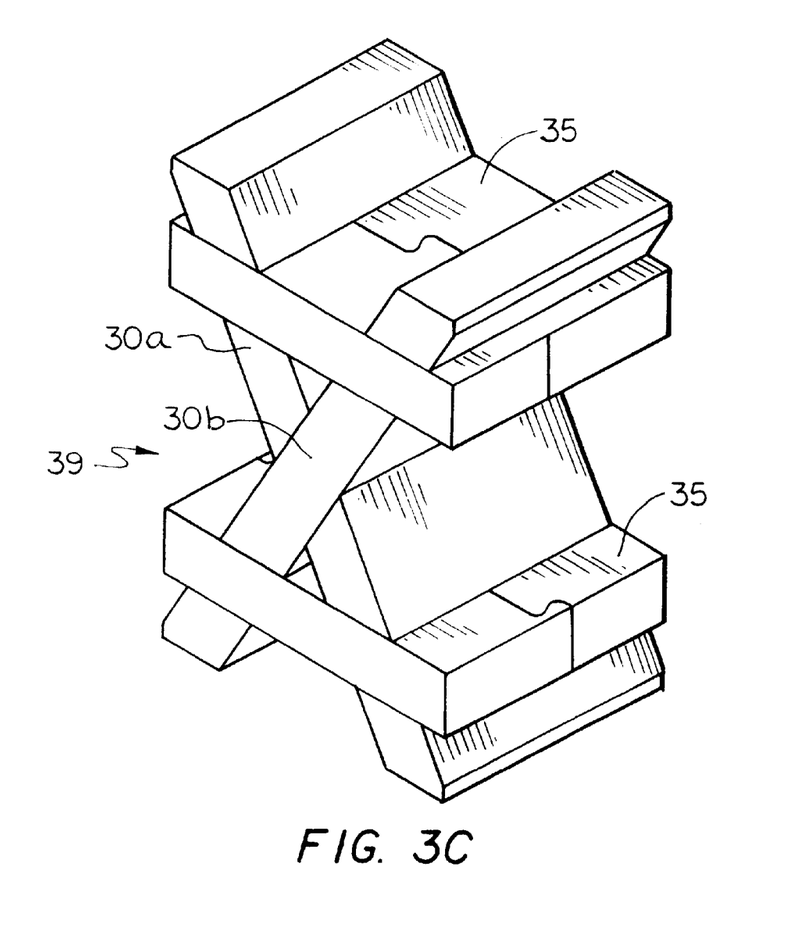
FIG. 3C shows the spacer preform as obtained after the components of FIG. 3A have been assembled together by mutual interfitting.

EXAMPLE 3 (FIGS. 3A, 3B, AND 3C)

FIG. 3A shows components for a spacer preform. These components are cut out from a plate of base fiber structure or from a plurality of similar plates.

The components of the preform comprise two legs 30a, 30b that are designed to be assembled together in a cross-configuration, and bottom and top cross-member elements 35a, 35b and 35'a, 35'b for interconnecting the legs in the vicinity of their ends.

Transverse notches 31a, 31b are formed substantially halfway along the legs 30a, 30b to a depth substantially equal to half the width thereof. The notches 31a, 31b are formed with sloping walls, i.e. walls that are not perpendicular to the faces of the legs, thereby enabling them to be assembled together in a cross-configuration by engaging them mutually via their notches 31a, 31b.

Other transverse notches 32a, 33a are also formed running from the longitudinal edges of the leg 30a in the vicinity of its bottom end and in alignment with each other, and two transverse notches 32'a, 33'a are formed from the edges of the leg 30a in the vicinity of its top end, likewise in alignment with each other. Similarly, transverse notches 32b, 33b, 32'b, 33'b are formed in the leg 30b, and the walls of these various notches are perpendicular to the faces of the legs.

The two bottom cross-member elements 35a, 35b are cut out in such a manner that, once united (FIG. 3B) they form a bar 35 having two slots 36, 37. These slots are formed by notches 36a, 37a, 36b, 37b cut out in two facing sides 38a, 38b of the elements 35a, 35b. The notches 36a, 37a, 36b, 37b are of length substantially equal to the thickness of the legs and they are bordered by walls that slope relative to the perpendicular to the faces of the elements 35a, 35b. These walls are inclined so as to enable the cross-member elements 35a, 35b to be assembled to the legs 30a, 30b when disposed in a cross-configuration, with the components being mutually engaged via the notches 32a, 33a, 32b, 33b.

Similarly, notches 36'a, 37'a, 36'b, 37'b are formed in two facing sides 38'a, 38'b of the top cross-member elements 35'a, 35'b with shapes and dimensions enabling these cross-member elements to be assembled to the legs 30a, 30b with mutual engagement via the notches 32'a, 33'a, 32'b, 33'b.

In order to ensure that the assembled preform holds together mechanically, the cross-member elements are assembled with mutual locking. To this end, respective lips 380a, 380b are formed at the ends of the sides 38a, 38b of the elements 35a, 35b, which lips are enlarged at their own ends and co-operate with corresponding respective recesses 381a, 381b. Similarly, complementary hook shapes 382a, 382b are formed in the middle portions of the sides 38a, 38b for snapping together when the two cross-member elements are brought close together parallel to their faces.

In the same manner, the sides 38'a, 38'b of the cross-member elements 35'a, 35'b have lips 380'a, 380'b and corresponding recesses 381'a, 381'b and complementary hook shapes 382'a, 382'b.

The way in which the preform is assembled is clear from the above description. Once the two legs 30a and 30b have been assembled together, the cross-member elements are put into place on either side of the legs and then moved towards each other and locked together while simultaneously interfitting with the uprights.

The cross-members are locked by the fiber structure thereof deforming in the locking portions.

FIG. 3C shows the assembled spacer preform 39 (with FIG. 3B showing only how the cross-member elements assemble together).

The preform is then densified without requiring any supporting tooling. The spacer can be used like the post of Example 2 as a loading element of a heat treatment oven.

Figure 4A:
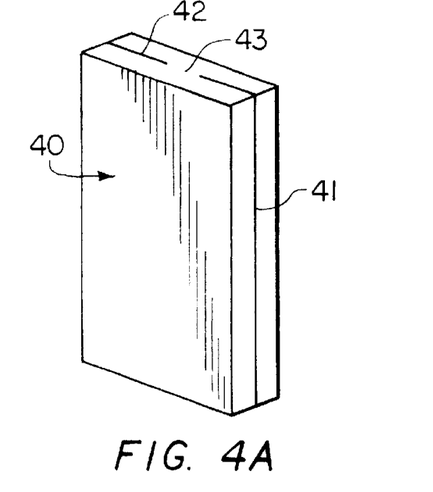
FIG. 4A is a perspective view of a split fiber structure plate for making a second form of spacer for oven-loading tooling.
Figure 4B:
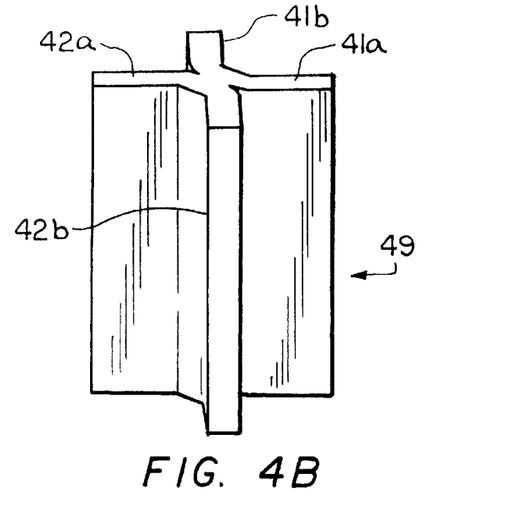
FIG. 4B is a perspective view of the spacer preform obtained by deforming the plate of FIG. 4A.

EXAMPLE 4 (FIGS. 4A AND 4B)

In the above examples, a preform is made by assembling various portions together.

FIGS. 4A and 4B show how a spacer preform can be made from a single plate 40 of base fiber structure without severing it completely.

The plate 10 is in the form of a rectangular parallelepipedal and it is split at mid-thickness along two opposite sides, e.g. along its two long sides.

The splits 41, 42 are formed to the same depth, leaving a central portion 43 intact (FIG. 4A).

The fiber structure portions 41a, 41b situated on either side of the split 41 are splayed apart from each other as are the fiber structure portions 42a, 42b situated on either side of the other split 42. Thus, by deforming the fiber structure, a spacer preform 49 is obtained of cross-shaped section (FIG. 4B).

It will be observed that the nature of the fiber structure, and in particular the way it is bonded by needling, makes such deformation possible without delamination and without tearing at the bottoms of the splits 41, 42.

The preform 49 can be held in shape for densification purposes by means of tooling, which tooling can be relatively lightweight, being just strong enough to hold the preform portions apart until consolidation has taken place, the preform 49 being densified by chemical vapor infiltration.

Another way of conserving the shape of the preform 49 consists in impregnating the fiber structure with a resin. This resin may constitute a precursor for the material of the matrix, e.g. by using a resin having a high coke content when densification is performed using carbon. Preform densification can be continued using a liquid or by chemical vapor infiltration.

After the spacer has been densified, it can be used for loading a heat treatment oven.

The use of a fiber structure plate 40 in which continuity of the fiber reinforcement is conserved makes it possible to avoid any risk of destruction by separately-fabricated preform portions coming apart.

Figure 5A:
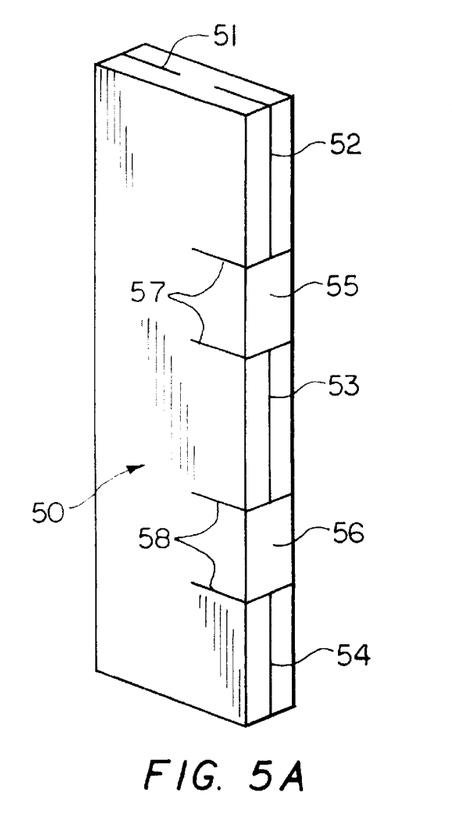
FIG. 5A is a perspective view of a split fiber structure plate for making a third form of spacer for oven-loading tooling.
Figure 5B:
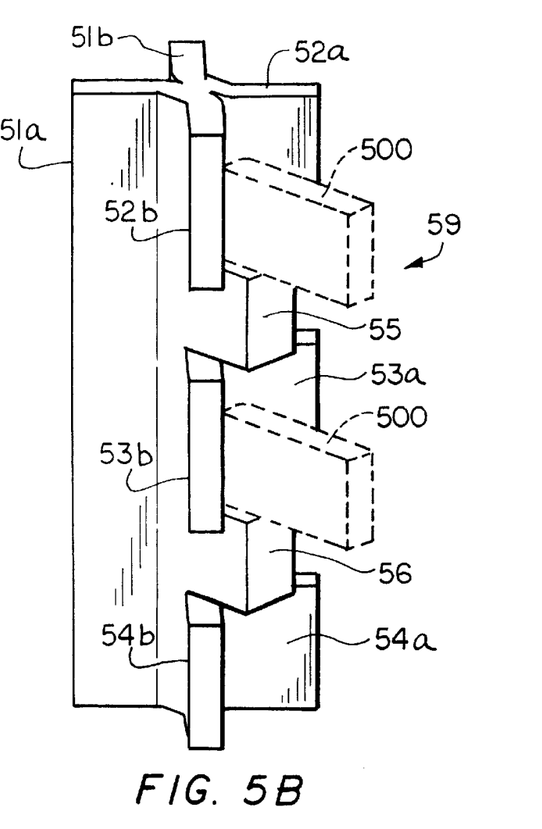
FIG. 5B shows the spacer preform obtained by deforming the plate of FIG. 5A.

EXAMPLE 5 (FIGS. 5A AND 5B)

FIGS. 5A and 5B show a method of making a stepped spacer preform, likewise from a single plate 50 of base fiber structure, and without completely severing it.

The plate 50 is in the form of a rectangular parallelepiped and is split at mid-thickness from two opposite sides, its two long sides. On one of its sides, the split 51 extends over the full length of the plate. On the opposite side, a plurality of splits are formed, there being three splits 52, 53, 54 in the example shown, and the splits are separated by non-split portions 55, 56. At the ends thereof transverse splits 57, 58 are formed perpendicularly to the side of the plate 50 to a depth substantially equal to the depth of the splits 52, 53, 54.

The fiber structure portions 51a, 51b situated on either side of the split 51 are spaced apart. The same applies to the fiber structure portions 52a, 52b situated on either side of the split 52, to the fiber structure portions 53a, 53b situated on either side of the split 53, and to the fiber structure portions 54a, 54b situated on either side of the split 54.

This produces the preform 59 of FIG. 5B. The preform can be held in the desired shape and densified in the same manner as described in Example 5.

After densification, the non-deformed portions 55, 56 define intermediate levels that can support parts 500 (shown in dashed lines in FIG. 5B).

Figures 6A, 6B:
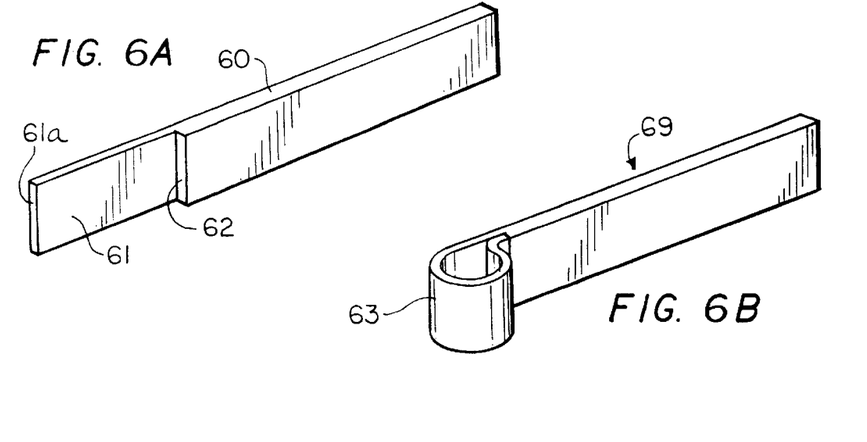
FIG. 6A shows a cut fiber structure plate for making a cross-member preform.
FIG. 6B shows the cross-member preform obtained by deforming the FIG. 6A plate.

EXAMPLE 6 (FIGS. 6A AND 6B)

FIGS. 6A and 6B show an embodiment of a cross-member preform in the form of a bar fitted with a ring at one end.

The perform is made from a rectangular bar 60 of base fiber structure. At one end, the bar 60 is split substantially at half-thickness, with one of the portions bordering the split being cut off and removed, leaving a terminal portion 61 of reduced thickness extending from the remainder of the bar and defining a step 62 (FIG. 6A).

The terminal portion 61 is folded back onto itself to form a loop 63 such that its end face 61a presses against the step 62 (FIG. 6B). The loop 63 is situated entirely to one side of the bar 60.

The preform 69 made in its way is densified by the desired matrix using a liquid or by chemical vapor infiltration. The preform is held in shape at least during a first stage of densification by tooling or by impregnation. The tooling is required only to conserve the shape desired for the loop 63.

Figures 7A, 7B:
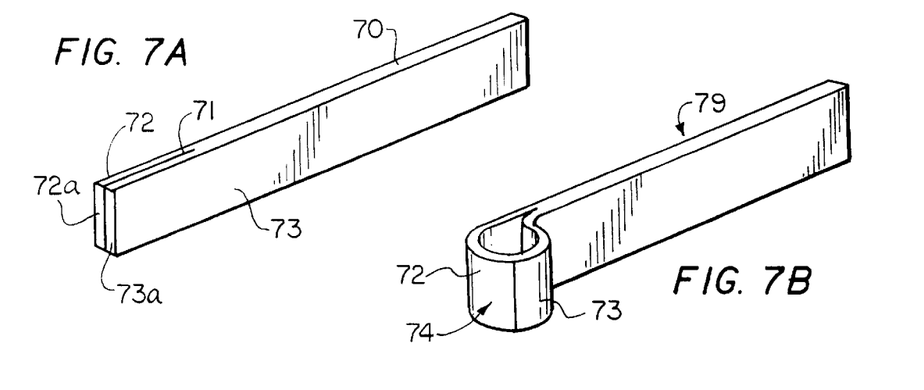
FIGS. 7A and 8A show two split fiber structure plates for making cross-member preforms.
FIGS. 7B and 8B show the cross-member preforms obtained by deforming the plates of FIGS. 7A and 8A respectively.

EXAMPLE 7 (FIGS. 7A AND 7B)

FIGS. 7A and 7B show another embodiment of a preform for a cross-member identical to that of FIG. 6. A rectangular bar 70 of base fiber structure is split substantially at half-thickness from one of its ends (FIG. 7A). The two portions 72, 73 bordering the split 71 are curved to form a loop 74 with the end faces 72a and 73a thereof being brought into end-to-end contact, the loop 71 being situated on one side of the bar 70. The way in which the fiber structure is built up prevents there being any risk of delamination or tearing at the bottom of the split 71. The preform is densified as in Example 6.

Figures 8A, 8B:
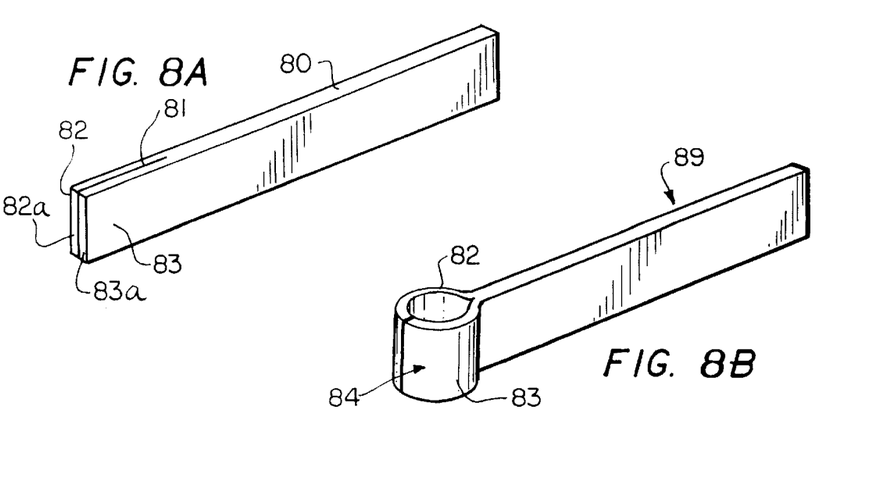

EXAMPLE 8 (FIGS. 8A AND 8B)

FIGS. 8A and 8B show another embodiment of a preform for a cross-member that is similar to that of FIG. 6.

A rectangular bar 80 of base fiber structure is split at substantially half-distance from one of its ends (FIG. 8A). The two portions 82, 83 bordering the split 81 are curved symmetrically about the plane of the split 81 to form a loop 84 with the end faces 82a and 83a of those portions being put in end-to-end contact.

A preform is thus obtained for a cross-member comprising a bar fitted with a ring, and having overall symmetry about its midplane parallel to the faces of the bar. The preform is densified as in Example 6.

Figure 9A:
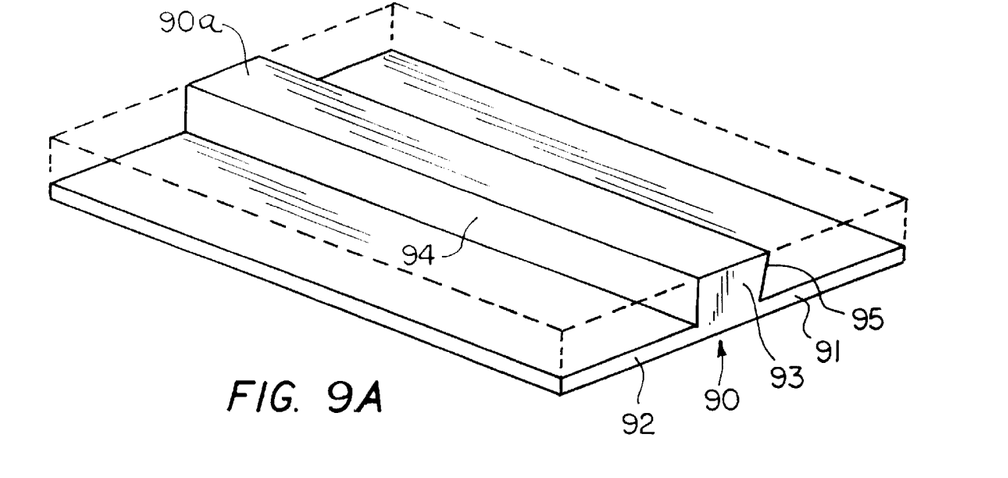
FIG. 9A is a perspective view of a cut fiber structure plate for making a spout preform.
Figure 9B:
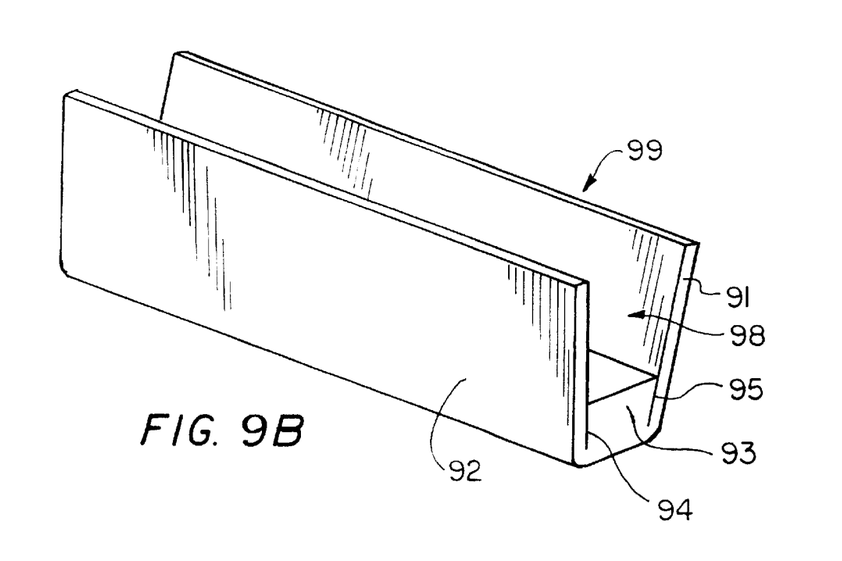
FIG. 9B shows the spout preform obtained by deforming the FIG. 9A plate.

EXAMPLE 9 (FIGS. 9A AND 9B)

FIGS. 9A and 9B show an embodiment of a spout preform.

The preform is made from a rectangular plate of base fiber structure 90. The plate 90 is cut away from one of its faces 90a and along its long sides so as to leave two wings 91, 92 connected to a central portion 93 left intact. The wings 91 and 92 are of the same width that is significantly greater than the width of the central portion 93 and of a thickness that is substantially smaller than that of the plate 90.

The plate 90 is cut from its face 90a in such a manner as to cause the lateral faces 94, 95 of the central portion 93 to slope slightly relative to the normal to the plate. Thus, the width of the central portion 93 increases slightly going away from its junction with the wings 91, 92 towards the face 90a.

The preform 99 is made by folding the wings 91, 92 up against the faces 94, 95 so as to obtain the shape of a slightly flared spout 98.

For densification purposes, the preform 99 is held in its shape by means of tooling. The tooling may be limited to means for holding the wings 91, 92 pressed against the faces 94, 95.

To make a spout that can be used at high temperatures, e.g. for conveying a flow of molten metal, the preform 99 is densified with a matrix of refractory material, e.g. a matrix of ceramic material such as silicon carbide (SiC). Densification by means of an SiC matrix can be performed by chemical vapor infiltration.

Figure 10A:
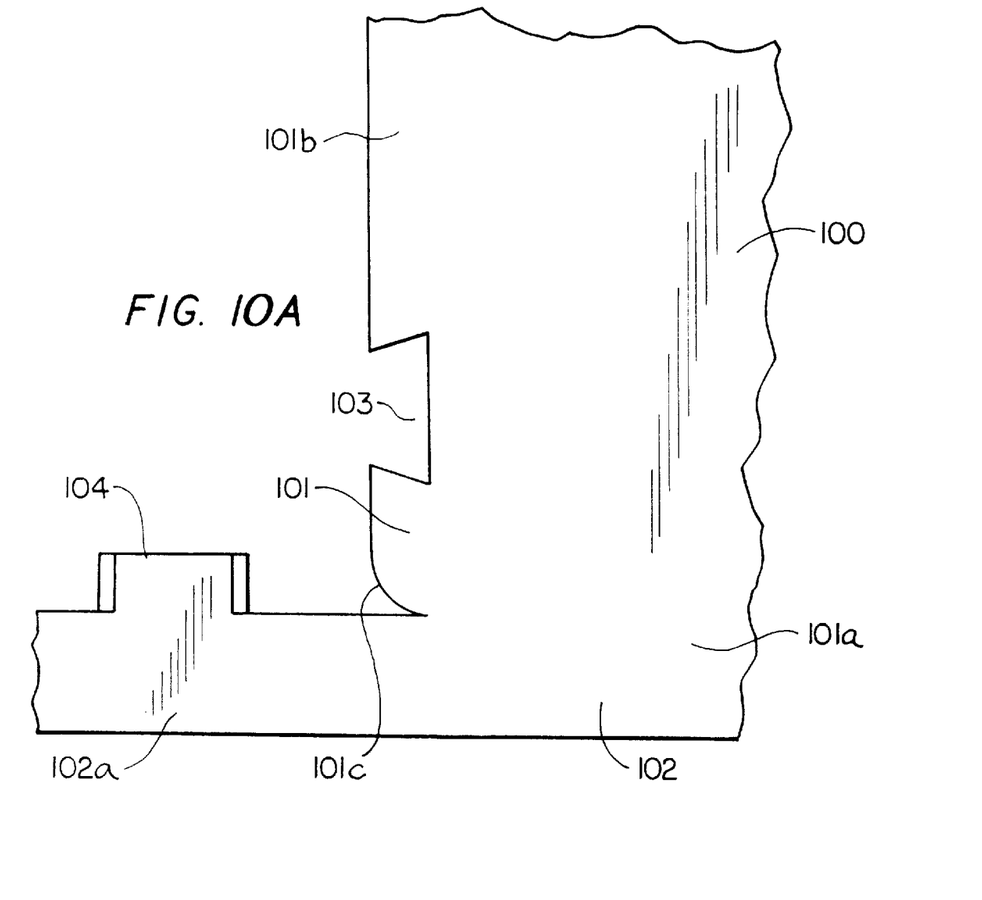
FIG. 10A is a fragmentary perspective view of a cut fiber structure plate for making a box preform.
Figure 10B:
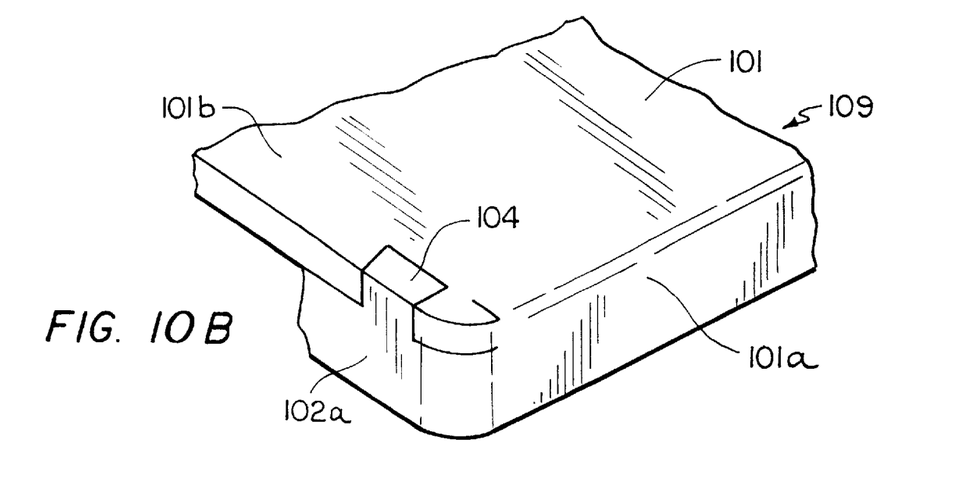
FIG. 10B is a fragmentary view of the box preform obtained by shaping the FIG. 10A plate.

EXAMPLE 10 (FIGS. 10A AND 10B)

FIGS. 10A and 10B show a portion of one way of making a box preform, with only one corner of the box being shown, it being possible to make the other corners in the same way.

The preform is made from a plate of base fiber structure 100. It is cut out to form a blank suitable for being folded to constitute a box preform. The plate 100 is cut to form a portion 101 that is to constitute the top, and portions 102 (only one shown in FIG. 10A) to form a rim, the fiber structure of the plate retaining its integrity. The portions 102 are disposed along two opposite sides 101a of the top-forming portion 101 and the ends thereof project beyond it. On each of the other two sides 101b of the top-forming portion 101, and at a relatively short distance from each of their ends, there is formed at least one male or female connection portion, e.g. a notch 103. At least one connection portion of complementary shape, in this case a projecting portion 104 is formed on the adjacent side of the rim portion 102.

The box preform 109 is made by folding each rim portion 102 along the zone 101a connecting it to the top-forming portion 101, and then by folding round each end 102a of the rim portions extending beyond the zone 101a. The connection portions 103, 104 are disposed so as to engage mutually after the ends 102a have been folded round (FIG. 10B).

It will be observed that the sides 101b are connected to the sides 101a by rounded portions 101c of a shape corresponding to that of the rounded corners of the box preform.

In addition, the connection portions 103, 104 may be shaped so that they lock together, with at least one of them, e.g. the notch 103, being dovetailed in shape. As a result, by taking advantage of the compressibility of the base structure, the preform 109 retains its shape without any need for tooling to be present for densification purposes.

The preform 109 is densified using a liquid or by chemical vapor infiltration to obtain the desired matrix. The box of composite material made in this way, e.g. a box of C—C or CMC composite material can be used as a tray for supporting parts to be treated in an oven. In which case the rims extend downwards and the corners of the box constitute anchor points for devices that handle or move the tray.

We claim:

1. A method of manufacturing a structural part of composite material and of complex shape, the method comprising making a fiber preform having substantially the shape of the part to be manufactured, and densifying the preform with a material constituting a matrix of the composite material, wherein the making of the fiber preform comprises the steps of:

providing at least one plane plate made of a deformable base fiber structure constituted by superposed two-dimensional fiber plies bonded together by needling and having no resin impregnation;

forming cuts or splits substantially transversely through said at least one plate of base fiber structure to constitute connection portions, at least one of said connection portions capable of being mutually mechanically interfitted and locked with at least another one of said connection portions; and shaping said at least one plate of base fiber structure by mutually engaging said connection portions, with said mutual engagement of at least some of said connection portions including deformation of the fiber structure;

whereby said fiber preform retains its shape following said mutual engagement of said connection portions, without assistance from any tooling or resin impregnation.

2. The method according to claim 1, wherein the making of a fiber preform further comprises the steps of:

providing a plurality of plane plates of deformable base fiber structure constituted by superposed two-dimensional fiber plies bonded together by needling, with cuts or splits being formed substantially transversely through said plane plates; and shaping the fiber preform by assembling together said plane plates, with at least one portion of a plane plate being engaged into a cut or split of another plane plate by deformation of said base fiber structure.

3. The method according to claim 1, wherein the making of a fiber preform further comprises the steps of:

providing a single plane plate of base fiber structure constituted by superposed two-dimensional fiber plies;

forming cuts or splits substantially transversely through said plane of base fiber structure to constitute said connection portions capable of being mutually engaged; and shaping the fiber preform by deforming said plane plate of base fiber structure and mutually engaging said connection portions.

* * * * *